United States Patent [19]

Linn

[11] Patent Number: 4,705,187

[45] Date of Patent: Nov. 10, 1987

[54] ENCLOSURE FOR A MACHINE TOOL

[75] Inventor: Thomas D. Linn, Holliston, Mass.

[73] Assignee: Boston Digital Corporation, Milford, Mass.

[21] Appl. No.: 4,080

[22] Filed: Jan. 16, 1987

[51] Int. Cl.$^4$ .................... B65D 43/14; B65D 51/04
[52] U.S. Cl. .................................................. 220/333
[58] Field of Search ................ 220/329, 333; 268/75; 160/188, 213

[56] References Cited

U.S. PATENT DOCUMENTS

| | | | |
|---|---|---|---|
| 2,241,179 | 5/1941 | Brenkert | 220/333 |
| 2,774,506 | 12/1956 | Miller | 220/333 |
| 2,865,529 | 12/1958 | Sprouse | 220/333 |

*Primary Examiner*—George T. Hall
*Attorney, Agent, or Firm*—Pahl, Lorusso & Loud

[57] ABSTRACT

Disclosed is an enclosure or housing for a machine tool that includes a rear wall, two side walls, a top wall and a partial front wall. A door, is positioned above the partial front wall and covers that portion of the housing not covered by the remaining walls. The door is constructed in two sections with one section lying above the other in a closed position. The two sections are preferably joined by a hinge, and a door is opened by lifting the bottom section in an upward direction which thereby causes a top section to also lift until the rear faces of the top and bottom sections meet at an acute angle. A pair of rollers is connected to the lower section and the roller will roll on a track on the side walls while at the same time the upper section swings on the hinge which connects the upper section to the top wall. A door counterweight facilitates the lifting of the door and maintains the door in an open position.

12 Claims, 4 Drawing Figures

4,705,187

ENCLOSURE FOR A MACHINE TOOL

BACKGROUND OF THE INVENTION

The present invention relates to an enclosure or housing and more particularly to an enclosure or housing for a machine tool.

Various machine tools, which are used for such purposes as milling, drilling, engraving or grinding, expel dust, fragments or other waste material which may harm an operator working in the area surrounding the machine tool. Such flying debris may also harm other machine tools adjacent the operating machine. For this reason, such machine tools are generally placed in housings which allow access to the machine tools. Housings also offer the significant advantage of reducing the noise emitted by some machine tools.

Many housings currently used with machine tools utilize doors which open from the middle towards the sides. Such doors require that the machine tool be surrounded by a sufficient empty floor space area so that the doors may swing freely and so that the operator may step back to allow the doors to swing. This additional area must not only be in the front of the machine but also at the sides since the doors will generally rest against the side of the housing. Other machine tool housings employ a lifting door riding on linear tracks. Such doors have the disadvantages of requiring great ceiling height to clear the operator's head and of being expensive to construct. Still others employ one or more sliding doors which also require additional floor space.

It is therefore a principal object of the present invention to provide an enclosure or housing for a machine tool which does not require a significant amount of floor space surrounding the enclosure or high ceiling clearance.

A further object of the present invention is to provide a housing or an enclosure for a machine tool which is easily opened and closed.

Still another object of the present invention is to provide a housing or an enclosure for a machine tool, the operating mechanisms of which housing will not be fouled by debris discarded by the machine tool.

SUMMARY OF THE INVENTION

The enclosure or housing for a machine tool of the present invention includes a rear wall, two side walls and a partial front wall. A door, preferably made of glass, is constructed in two sections with a pivot joint (preferably a hinge) mounted between the two sections. The door is opened by pulling a handle at the upper end of the lower section a few inches forward and upward, lifting both the upper and lower sections of the door. A pair of cables and counterweights then lift both parts upward until the rear face of the bottom section nearly meets the rear face of the top section. The lower end of the bottom section rolls on tracks provided at either side of the door.

These and other features and objects of the present invention will be more fully understood from the following detailed description which should be read in light of the accompanying drawings, in which corresponding reference numerals refer to corresponding parts throughout the several views.

DETAILED DESCRIPTION OF THE PREFERRED EMBODIMENT

Figure 1:
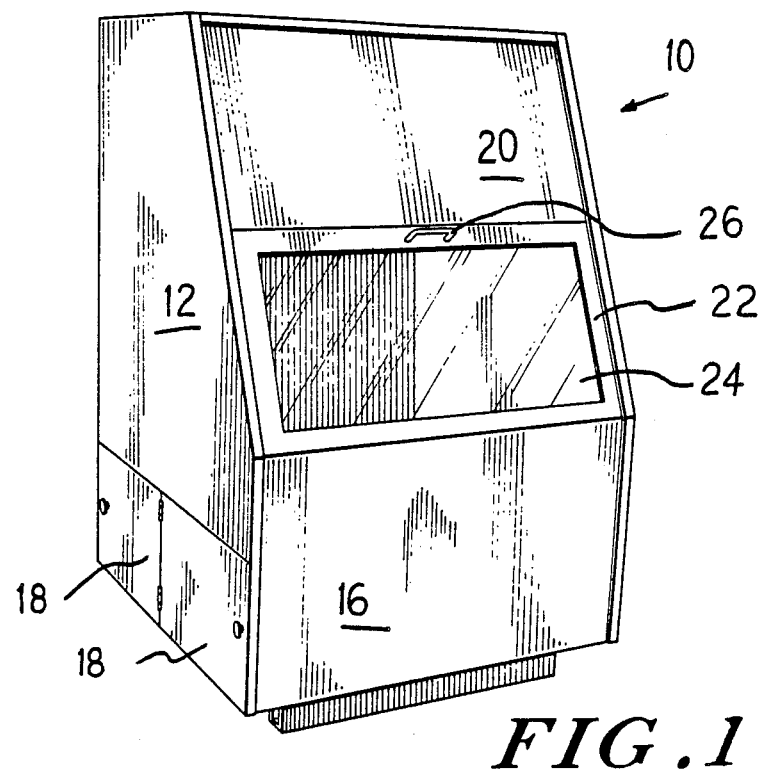
FIG. 1 is a perspective view of the enclosure of the present invention in which the door, through which access to the machine tool is gained, is in a closed position.
Figure 2:
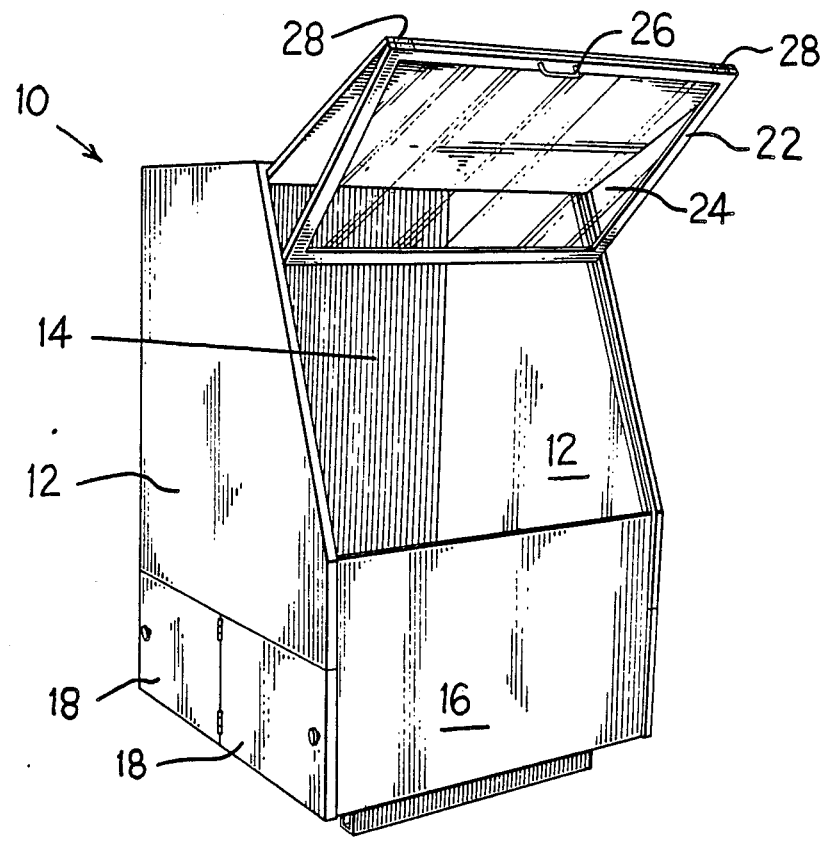
FIG. 2 is a perspective view of the enclosure of the present invention shown in FIG. 1 with the door in an opened positioned.

Referring to FIGS. 1 and 2, the enclosure 10 of the present invention includes side walls 12 and a rear wall 14. All three of these walls are of substantially the same height. One or both of the side walls may include one or more lower doors 18, which allow access to the base of the machine tool. These doors are especially useful for cleaning debris that accumulates around the machine tool. A partial front wall 16 has a height only a fraction of that of the side and rear walls.

At a portion of the enclosure above the front wall 16, the side walls are angled back from the front wall. The portion of the front wall above the partial wall 16 is covered by a door 19 which in the preferred embodiment includes a solid top section 20 and a windowed bottom section 21 which includes a frame 22 and a transparent surface 24. The door is designed so that when the handle 26 is pulled, the two door sections 20, 21 pivot relative to each other about hinges 28 so that in a fully opened position the two door sections form a small included angle with respect to each other. The door 19, when closed, constitutes the upper front wall above partial front wall 16. The door 19, follows the shape of the side walls 12 and is therefore angled, from bottom to top, toward the rear of the housing.

Figure 3:
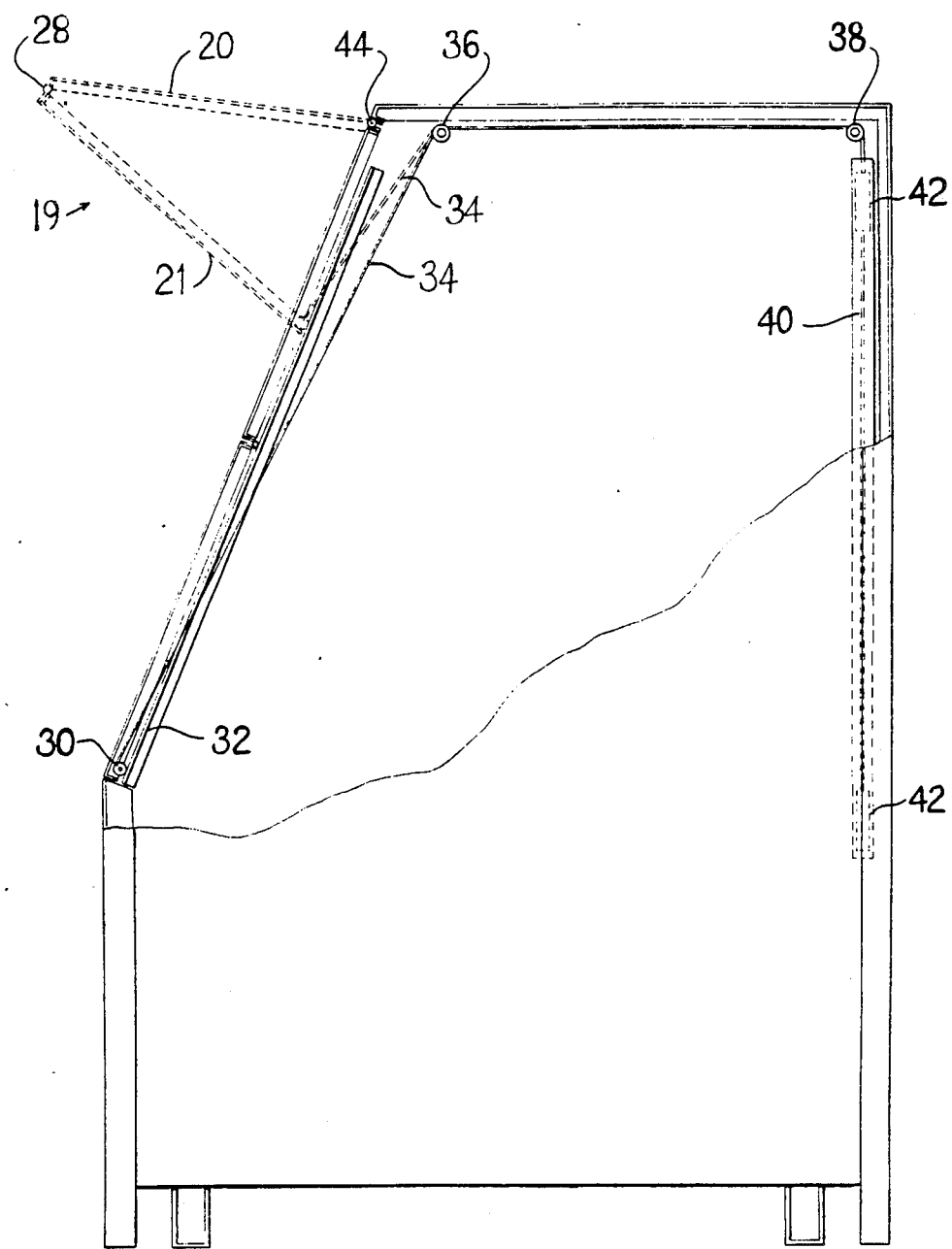
FIG. 3 is a side sectional view of the enclosure of the present invention shown in FIG. 2.
Figure 4:
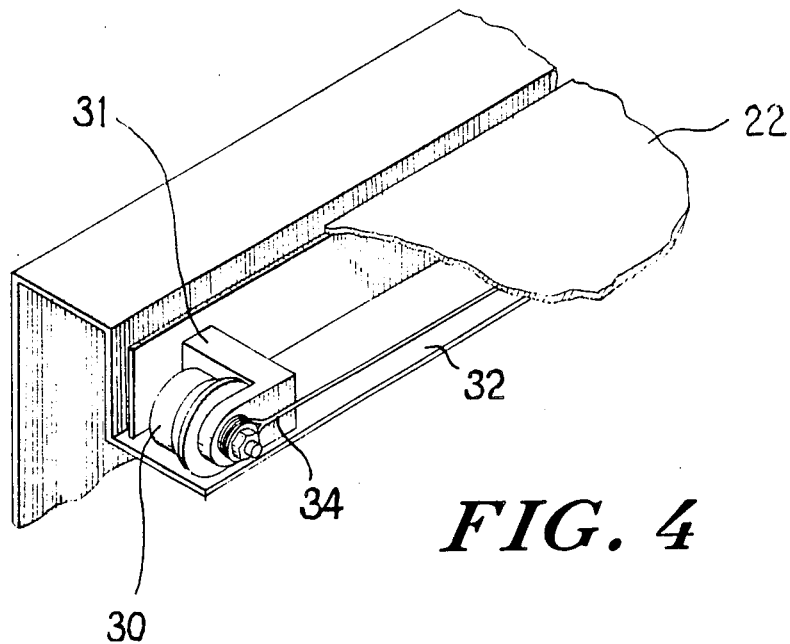
FIG. 4 is a view, partly in perspective and partly in section, of the roll or roller assembly shown in FIG. 3.

Referring now to FIGS. 3 and 4, the operating mechanism of the doors of the enclosure of the present invention will now be more fully discussed. At the bottom of the frame 22 of the bottom door section 21, a roller 30 is attached on each side. The roller 30 is mounted to the frame 22 by a bracket 31. The roller will roll on a track 32 which is part of each side wall 12. A cable 34 is pivotally connected to the bracket 31. The cable 34 is wrapped around two rollers one at the front and one at the rear of the top of each side of the enclosure. A door counterweight 42, attached to the end of the cable 34, is housed in a guide slot 40.

As the door is lifted by pulling handle 26, both door sections 20, 21 begin to pivot about hinges 28 and the upper door section 20 also pivots in a clockwise direction about hinge 44. While the upper door section 20 is pivoting about hinge 44, the lower door section 21, with rollers 30 guided in tracks 32, begins to slide upwardly in the frame 32. As the lower door section 21 rolls in an upward direction in the frame 32, counterweight 42 begins to fall in the guide slot 40. The weight of the counterweight is selected to automatically carry the door to its upward position after handle 26 is pulled a few inches and will remain in that position until handle 26 is pulled downward to close the door. To close the door, the door is pulled all the way down, but the force decreases as the closed position is approached. Preferably, air dampers are connected to the counterweights so that the door glides up at a controlled rate. As shown clearly in FIG. 3, as the lower door section 21 rises, the angle of cable 34 approaching roller 36 changes and in the full upward position forms the angle 43 with respect to pivot 35. The resultant upward force on pivot 35 is force 44. This exactly counteracts the downward force on pivot 35 caused by the gravity weight of the door assembly, preventing further upward motion and holding the doors in the open position. To once again close the doors, the handle 26 is simply pulled downward and the door rolls down the tracks. In the closed position, the cable force lies almost exactly in the same plane as the outer face of the door, unable to overcome the gravity weight of the door assembly leaning inward on the track, and thus the door is self locking closed.

In a preferred embodiment, the windowed bottom section of 21 is slightly taller than the solid top section 20. This arrangement reduces strain on the hinges, prevents the doors from slamming upwards and eases the force required to start the closing of the door. As an example, suitable heights would be 21.5 inches for the top section 20 and 24.5 inches for the bottom section 21. This embodiment also provides the advantage of an increased windowed area.

The invention described above provides an enclosure or housing for a machine tool which does not require a significant amount of space surrounding the enclosure. The maximum extension of the door beyond the area defined by the base is minimal, and this extension is only at the highest portion of the enclosure well above the operator's head. The angling back of the side walls not only prevents the door from extending far beyond the enclosure but also allows an operator to easily gain access to the machine tool within the enclosure.

While the foregoing invention has been described with reference to its preferred embodiments, various alterations and modifications will occur to those skilled in the art. In particular, while the door of the present invention has been described as having one glass panel 24, top door section 20 may also include a glass panel, or neither door section may include a glass panel. Also, it is possible to utilize other operating mechanisms which will slide the door in an upward direction and maintain it in that position. These and all such other modifications and alterations are intended to fall within the scope of the appended claims.

What is claimed is:

1. An enclosure for a machine tool comprising:
    a rear wall and two side walls of substantially equal height;
    a front wall comprising:
    a lower stationary partial wall;
    top and bottom door sections connected to each other by a means for allowing said top and bottom door sections to pivot relative to each other about a pivot axis, said top door section also being connected to a top frame member by a means for allowing said top door to pivot from a closed, substantially vertical position to a substantially horizontal position;
    whereby when said bottom door section is raised, the bottom and top door sections pivot towards one another and said top door section pivots in an upward direction until inner faces of said door sections form an acute angle.

2. The enclosure for a machine tool of claim 1 wherein said two side walls comprise one vertical edge surface and one edge surface that is partly vertical and partly angled from bottom to top towards said vertical edge surface.

3. The enclosure for a machine tool of claim 1 wherein said means for allowing the top and bottom door sections to pivot relative to each other is at least one hinge connected between an end of said bottom door section and an end of said top door section.

4. The enclosure for a machine tool of claim 1 wherein said means for allowing said top door section to pivot is a hinge connected between said top frame member and said top door section.

5. The enclosure for a machine tool of claim 1 further comprising:
    two parallel tracks, one of said tracks extending from each side wall toward the opposite side wall;
    roller elements mounted on each side of said bottom door section for engagement with said tracks.

6. The enclosure for a machine tool of claim 1 further comprising means for maintaining said bottom and top door sections in an opened position.

7. The enclosure for a machine tool of claim 5 further comprising means for maintaining said bottom and top door sections in an opened position.

8. The enclosure for a machine tool of claim 7 wherein said means for maintaining said bottom and top door sections in an opened position comprises:
    a cable connected to the end of said bottom door section to which said roller element is mounted;
    a counterweight connected to the second end of said cable;
    a pivot roller for guiding said cable, said pivot roller being positioned so as to always be between said counterweight and said end of said bottom door section to which said roller is connected.

9. The enclosure for a machine tool of claim 1 wherein said bottom door section is taller than said top door section.

10. The enclosure for a machine tool of claim 8 further comprising a damper connected to said counterweight for limiting movement of said counterweight to a controlled rate.

11. The enclosure for a machine tool of claim 1 further comprising means for enabling said bottom door section to rise without the application of a force once said bottom door section is lifted slightly from said closed position.

12. The enclosure for a machine tool of claim 11 wherein said means for enabling said bottom door section to rise without the application of a force comprises:
    a cable connected to a lower end of said bottom door section;
    a counterweight connected to the second end of said cable, said counterweight having a mass that will exert a force on said bottom door section that counteracts a downward force of said top and bottom door sections caused by gravity weight of said top and bottom door sections;
    a pivot roller for guiding said cable, said pivot roller being positioned so as to always be between said counterweight and said end of said bottom door section to which said roller is connected.

* * * * *